April 15, 1924.　　　　　　W. V. TURNER　　　　　1,490,148
COMBINED CAR AND ELECTRIC COUPLER
Filed Feb. 3, 1919　　　2 Sheets-Sheet 1
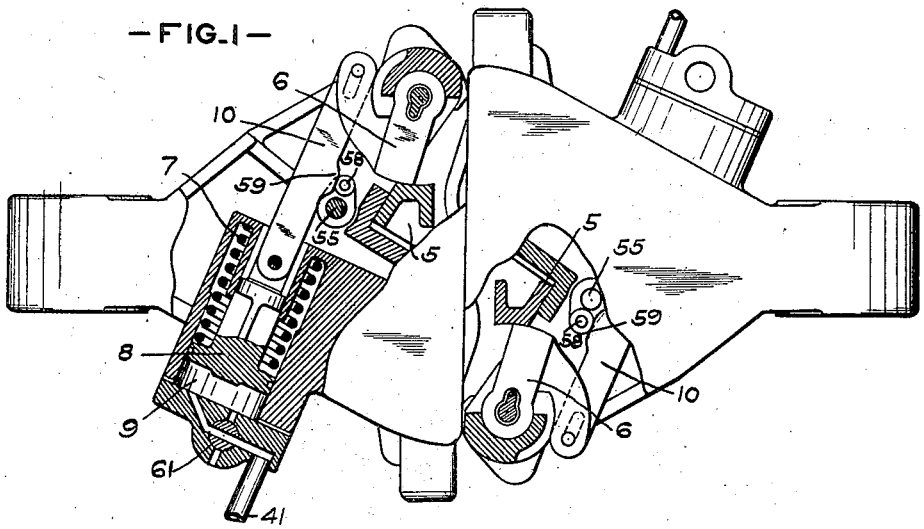
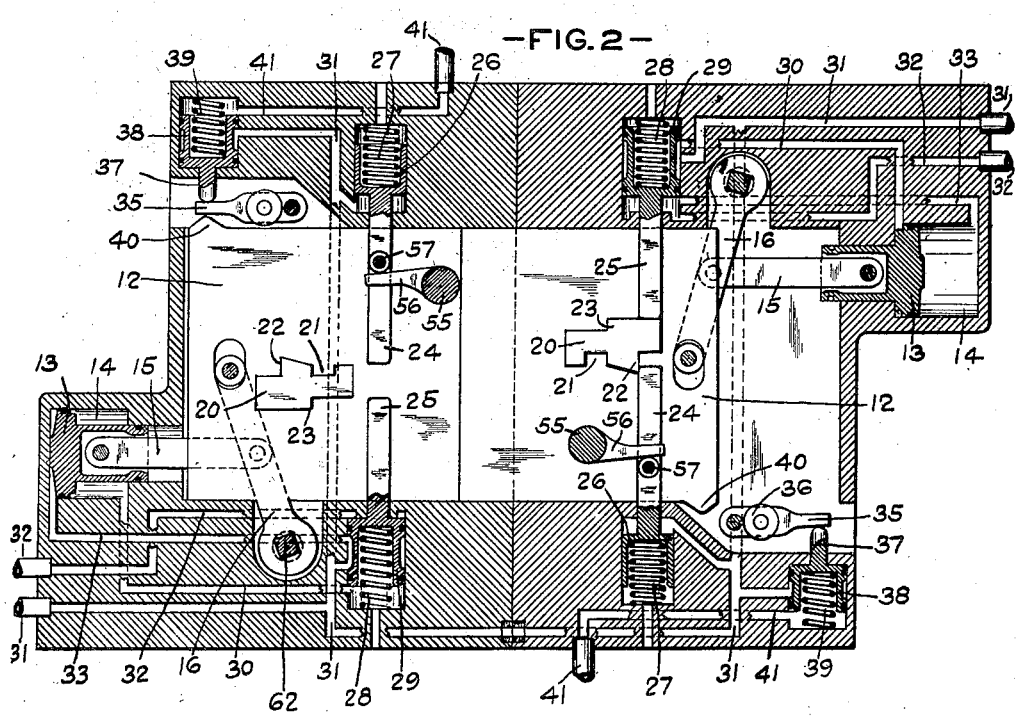
INVENTOR
WALTER V. TURNER (DEC'D)
S. C. McCONAHEY, ADMR.
by Edward Wright
Atty April 15, 1924.
W. V. TURNER
1,490,148
COMBINED CAR AND ELECTRIC COUPLER
Filed Feb. 3, 1919   2 Sheets-Sheet 2
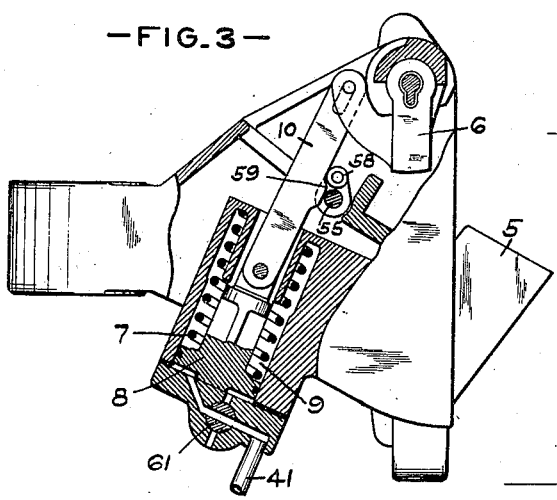
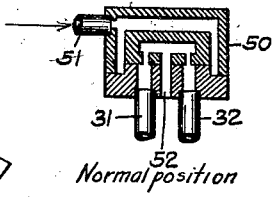
Normal position
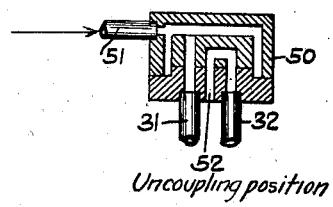
Uncoupling position
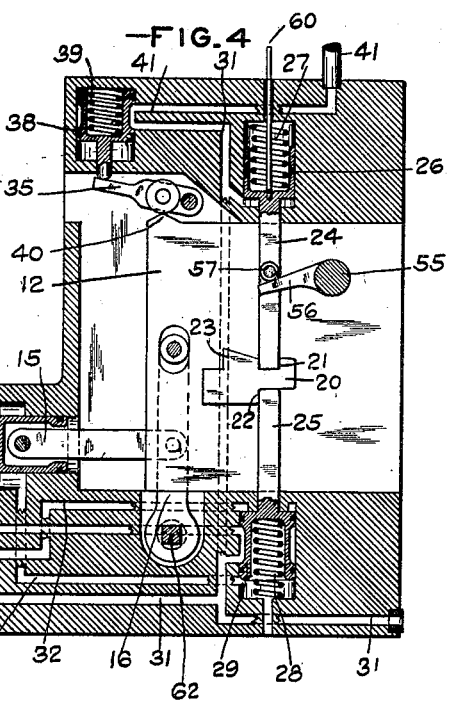
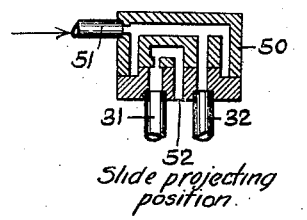
Slide projecting position.
INVENTOR
WALTER V. TURNER (DEC'D)
S.C. McCONAHEY, ADM'R.
by Edward Wright
Atty Patented Apr. 15, 1924.

1,490,148

UNITED STATES PATENT OFFICE.

WALTER V. TURNER, DECEASED, LATE OF WILKINSBURG, PENNSYLVANIA; BY SAMUEL C. McCONAHEY, ADMINISTRATOR, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMBINED CAR AND ELECTRIC COUPLER.

Application filed February 3, 1919. Serial No. 274,760.

*To all whom it may concern:*

Be it known that WALTER V. TURNER, deceased, late a citizen of the United States, and resident of Wilkinsburg, in the county of Allegheny and State of Pennsylvania, invented a certain new and useful Improvement in Combined Car and Electric Couplers, of which improvement the following is a specification.

This invention relates to coupling mechanism for cars, and in which means is provided for connecting the respective electric train line circuits between the cars. Various forms of electrical coupling devices have been designed for this purpose, and in which each counterpart coupler has a plurality of electric contacts connected to the respective car line circuits, and a movable member carrying suitable contacts and adapted to be projected into the counterpart coupler on the adjoining car for establishing electrical connection between the corresponding contacts and circuits of the respective cars. Means operated by fluid pressure have also been provided for releasing the coupler locks and for projecting and withdrawing the contact carriers or slides.

My present invention relates more particularly to that type of electric coupler in which the contact carrier that is projected is adapted to engage and push back the contact carrier of the counterpart coupler on the adjoining car, so that the contact carrier or slide has three positions, i. e., the projected position, in which it extends into the adjoining coupler and pushes back the carrier therein; the normal position, where it is withdrawn within the casing; and the extreme inner position, to which it is forced by the carrier of an adjoining coupler. The contact carrier is also operated by fluid pressure in both directions, and the main object of my present invention is to provide improved mechanism for this purpose, including a single piston connected to the contact carrier or slide, and having suitable stop devices for defining the normal intermediate position.

In the accompanying drawings: Figure 1 is a view, partly in plan and partly in horizontal section, of a pair of couplers coupled together; Fig. 2, a diagrammatic horizontal section of the electric portion of the two couplers, and showing the position of the slides when the circuits are connected; Fig. 3, a view similar to Fig. 1, but showing one coupler only, with parts in release or uncoupled position; Fig. 4, a view similar to Fig. 2, but showing only one electric coupler, with the parts in the normal intermediate or uncoupled position; and Figs. 5, 6 and 7, diagrammatic sections, illustrating the different positions of the manual valve for controlling the operation of the coupler.

According to the construction shown in the drawing, my improvement is applied in connection with a coupler of the rigid lock type, in which the counterpart couplers are each provided with a hook-shaped projecting portion, 5, having vertical plane surfaces arranged diagonally, whereby the couplers engage each other with a relative lateral movement during the coupling action, and each coupler also having a pivoted lock or cam lever, 6, adapted to be automatically clamped against the projection, 5, of the adjoining counterpart coupler for rigidly locking the same together. The locking levers, 6, are normally pressed outward by means of springs, 7, acting on pistons, 8, mounted in cylinders, 9, and connected by rods, 10, with the pivoted locks for releasing the same by fluid under pressure admitted to said cylinders.

The electric portion of the coupler which may be mounted in a casing secured to the bottom of the coupler head, usually contains a plurality of electric contacts connected to the respective car line circuits, and a contact carrier or slide having suitable contacts and adapted to be projected into the casing of the adjoining coupler for establishing electric connection between the corresponding circuits of the two cars when coupled together in the usual way. The electric contacts are not shown in the drawing, but the slide, or contact carrier, 12, as shown in Figs. 2 and 4, is mounted in the casing of each counterpart coupler, and is operated by a single piston, 13, mounted in cylinder, 14, and connected to said slide by means of rod, 15, and pivoted arm, 16. The slide is adapted to be moved either inward or outward from its normal intermediate or neutral position, indicated in Fig. 4, in which its piston, 13, occupies an intermediate position in cylinder, 14. When the couplers are coupled together and fluid pressure is supplied to one piston, it forces one slide outward to its projected position, as indicated at the right in Fig. 2, and it also pushes the slide of the other coupler inward to its extreme inner position, with its piston at the opposite end of its cylinder, as indicated at the left in Fig. 2.

For the purpose of holding the carrier or slide, 12, in its respective positions, a stop mechanism is employed, comprising a projection or lug, 20, having a notch, 21, and shoulders, 22 and 23, for co-operating with spring actuated latch bars, 24 and 25. The bar, 24, is operated by piston, 26, and spring, 27, while the bar, 25, is actuated by a spring, 28, and piston, 29, which also comprises a valve for controlling communication between the passages, 30, 31, 32, and 33. An interlocking means is provided between the coupler lock and the stop device of the slide to lock the slide against movement when the couplers are unlocked and separated, but to permit movement of the slide when the couplers are locked together. Such a means may comprise a cam shaft, 55, having a cam, 56, bearing against a roller, 57, on latch bar, 24, and a cam, 58, adapted to engage a projection, 59, on the rod, 10, of the coupler lock.

The passage and pipe, 31, and also the passage and pipe, 32, are controlled by a manually operated valve, 50, one at each end of the car, said valve also having a fluid supply connection, 51, and an exhaust port, 52, as shown in Figs. 5, 6 and 7. In the normal position of the valve, 50, both pipes, 31 and 32, communicate, through restricted ports, with the exhaust, 52. Passages, 30 and 33, communicate with the opposite ends of the cylinder, 14, and passage, 31, communicates with the corresponding passage, 31, in the counterpart coupler through any suitable connection at the face of the couplers when the two members are brought together, as indicated in Fig. 2.

In the normal release position, with the couplers separated, the parts occupy the positions shown in Figs. 3 and 4, the spring, 26, holding the latch bar, 24, in the notch, 21, of the stop, 20, and preventing accidental movement of the slide. When the couplers are brought together in the act of coupling, the mechanical coupler heads are locked together in the usual way, as indicated in Fig. 1, and the electrical portions engage each other by their coupling faces with the contact carriers or slides substantially flush with said coupling faces. During this coupling action the projection, 59, on rod, 10, operates to turn the cam shaft, 55, so as to withdraw the latch bar, 24, from the notch, 21, and partially compress the spring, 27, as indicated in Figs. 1 and 2. In this position the bar, 25, engages the shoulder, 23, as shown in Fig. 4.

If then it be desired to make the electric connection between the couplers, one of the manually operated valves, 50, upon one of the cars is turned to its slide projecting position, indicated in Fig. 7, in which fluid under pressure flows through pipe and passage, 32, to the inner face of piston valve, 29, where it pushes the same outward to withdraw the locking bar, 25, from the shoulder, 23, of the stop, 20, and also opens the port, 33, leading to the inner end of the cylinder, 14. The pressure acting on the piston, 13, in cylinder, 14, then operates to force its slide, 12, outward to its projected position, and into the casing of the other coupler, pushing back the slide therein to its inner position, as shown in Fig. 2. During this movement the piston, 13, of the first coupler, moves to the outer end of its stroke, while the piston, 13, of the other coupler is pushed from its intermediate position to the inner end of its cylinder. The latch bar, 24, also rides up on the inclined face of the shoulder, 22, and is then moved in by the spring, 27, to lock behind said shoulder and hold the slide securely in its projected position. The outer ends of the chambers of pistons, 26 and 29, are open to the atmosphere. When the manual valve, 50, is in this slide projecting position shown in Fig. 7, the pipe and passage, 31, communicates, through a restricted port, with the exhaust, 52, and as the valve, 29, also connects passage, 31, with passage, 30, there is a free escape of fluid from the outer end of cylinder, 14, as the piston, 13, moves outward to project the slide, 12. The inner end of cylinder, 14, of the other coupler is also open to the atmosphere at this time through passages, 33 and 31, and either manual valve, so that its piston, 13, may be freely moved inward as its slide, 12, is pushed back by the projected slide of the other coupler. The manual valve, 50, is then turned back to its normal position, Fig. 5. The high portion of the shoulder, 23, of stop, 20, engages the bar, 25, and retains the valve, 29, in its outer position against the spring, 28, when the fluid pressure is released from the inner face of the valve piston. The electric connections are thereby established between the cars and the parts remain in this position until it is desired to uncouple the cars.

In the operation of uncoupling, the slides must first be returned to their intermediate neutral positions, and for this purpose one of the manual valves, 50, is turned to its uncoupling position, indicated in Fig. 6, in which fluid from the supply flows through pipe and passage, 31, thence through valve, 29, and passage, 30, to the outer end of cylinder, 14, of one coupler, and through valve, 29, and passage, 33, to the inner end of cylinder, 14, of the other coupler. It will be noticed that in the coupler in which the slide occupies its inner position, the stop, 20, is moved clear of the bar, 25, so that the spring, 28, holds the piston valve, 29, at its inner position with passage, 31, connected to passage, 33. Fluid from passage, 31, also acts upon the face of piston, 26, and moves it outward to withdraw the latch bar, 24, clear of the shoulder, 22, of the stop, 20, on the projected slide. The fluid pressure acting on the outer face of piston, 13, of the projected slide now moves the same inward and withdraws the slide, 12, until the shoulder, 23, of the stop, 20, passes the bar, 25, whereupon the spring, 28, shifts the bar, 25, and valve, 29, inward, thereby cutting off the supply of fluid to passage 30 and the outer end of cylinder, 14, and connecting the supply from passage, 31, to passage, 33, and the inner end of cylinder, 14. Passage, 30, also communicates with the atmosphere at the outer end of the piston valve chamber so that the fluid pressure acting on the inner face of piston, 13, immediately arrests the withdrawing movement of the slide and reverses the movement to whatever extent is necessary to bring the shoulder, 22, of the stop up against the locking bar, 25. This defines and limits the return movement of the slide to the normal neutral position. In the other coupler the fluid pressure acting through passages, 31 and 33, and the inner end of cylinder, 14, moves the piston, 13, and its slide 12, out to its neutral position, in which the shoulder, 23, of stop, 20, engages the bar, 25, and limits the return movement. During this operation the manual valve of the other coupler remains in its normal position, (Fig. 5), and the pipe, 31, is in communication with the exhaust port, 52, through the restricted port before referred to. This will permit a slight leakage of compressed air to the atmosphere but the restriction is so small that it will not prevent the prompt accumulation of fluid pressure upon the faces of the pistons and the operation of the apparatus as above described.

The coupler heads may now be unlocked and separated, but in order that this may not be accomplished until the slides have been returned to neutral position, there is provided a valve, 38, adapted to be actuated by a projection, 40, on slide, 12, through a roller, 36, pivoted arm, 35, and stem, 37, to open communication from passage, 31, to passage and pipe, 41, leading to unlocking cylinder, 9, of the coupler. It will therefore be seen that when both slides have returned to their neutral positions, fluid flows into cylinders, 9, and operates the pistons, 8, to unlock the couplers in the usual way. As the couplers are then pulled apart, the projection, 59, moves away from the cam, 58, so that the spring, 27, moves the latch bar of each coupler into the notch, 21, of the stop, and securely locks the slide in its neutral position, as shown in Fig. 4. After the couplers are separated, the manual valve is returned to normal position, Fig. 5. A spring, 39, acts upon the valve, 38, to move the same to cut off communication between the passages, 31 and 41, when the slides are moved to establish electric connection between the cars, as indicated in Fig. 2. Either one of the manual control valves may be manipulated to perform the coupling or uncoupling operations.

If it be desired to permit an outward movement of a slide by fluid pressure when the couplers are separated, a tool, such as 60, may be inserted through an opening into the chamber of piston, 26, and attached to latch bar, 24, for withdrawing the same by hand, as indicated in Fig. 4.

If it be desired to return the slides to neutral position when the couplers are coupled together, and without unlocking the couplers, cocks, 61, are turned to a position at right angles to that shown in Fig. 1, for cutting off communication from passages, 41, to the unlocking cylinders, 9, and venting the same to the atmosphere.

When the couplers are separated, if it should be desired to operate the slide manually, this may be done by applying a wrench to a squared end of the shaft, 62, of the pivoted arm, 16, after the latch bar, 24, has been withdrawn from the notch, 21, by means of the tool, 60.

By means of my improvement the construction is simplified, and the operation of the slides rendered definite and positive.

Having now described my invention, what I claim as new and desire to secure by Letters Patent is:

1. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, means for admitting fluid to actuate the piston in both directions, and a stop device for limiting the return movement of the contact carrier and piston to the intermediate neutral position.

2. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, means for admitting fluid to actuate the piston in both directions, a stop device for limiting the movement of the carrier, and means actuated by fluid pressure for releasing the stop.

3. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, a manually operated valve for controlling the fluid pressure acting on said piston, and a valve means governed by the position of the contact carrier for reversing the connections between the manual valve and the actuating piston.

4. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, means for admitting fluid to actuate the piston in both directions, and means operated by the return movement of the carrier for reversing the action of said piston.

5. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, a stop device for limiting the movement of the carrier, a manual valve for controlling the action of the piston, a means operated by the flow of fluid from the manual valve to said piston for releasing the stop device.

6. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, a stop device for limiting the return movement of the carrier, and a valve means connected to the stop device for controlling a supply of fluid to the actuating piston.

7. In an electric coupler for cars, the combination with a casing containing a contact carrier having a normal intermediate neutral position, an outer position to which it is projected for establishing electrical connections with a counterpart coupler, and an inner position to which it is adapted to be pushed by the contact carrier of the other coupler, of a piston connected to the contact carrier, a stop on the carrier, a locking bar for engaging the stop, a piston valve connected to said bar for withdrawing the same and for reversing the supply connections to the actuating piston.

In testimony whereof I have hereunto set my hand.

SAMUEL C. McCONAHEY,
*Administrator of the Estate of Walter V. Turner, Deceased.*